(12) United States Patent
Schmidt et al.

(10) Patent No.: US 9,119,498 B2
(45) Date of Patent: Sep. 1, 2015

(54) CULINARY EXTRUDING AND MINCING TOOL

(75) Inventors: Jonathan B. Schmidt, Round Rock, TX (US); Dennis P. Haggerty, Austin, TX (US)

(73) Assignee: Grace Manufacturing, Inc., Russellville, AR (US)

( * ) Notice: Subject to any disclaimer, the term of this patent is extended or adjusted under 35 U.S.C. 154(b) by 821 days.

(21) Appl. No.: 13/415,158

(22) Filed: Mar. 8, 2012

(65) Prior Publication Data

US 2013/0232799 A1    Sep. 12, 2013

(51) Int. Cl.
*A47J 37/12*    (2006.01)
*A47J 19/06*    (2006.01)

(52) U.S. Cl.
CPC ..................................... *A47J 19/06* (2013.01)

(58) Field of Classification Search
CPC .. A47J 9/00; A47J 9/002–9/006; A47J 43/08; B02C 18/00; B02C 18/22
USPC ......... 30/114–117; 83/408, 857; 99/509, 510, 99/537, 567; 241/95, 168, 169
See application file for complete search history.

(56) References Cited

U.S. PATENT DOCUMENTS

| | | | |
|---|---|---|---|
| 223,129 A * | 12/1879 | Garst | 83/437.6 |
| 612,924 A | 10/1898 | Grenier | |
| 2,181,674 A | 11/1939 | Truesdale | |
| 2,312,940 A | 3/1943 | Truesdale | |
| 2,661,039 A | 12/1953 | Davis et al. | |
| 2,737,721 A * | 3/1956 | Hart | 83/437.5 |
| 4,513,501 A * | 4/1985 | Lee | 30/115 |
| 4,644,838 A | 2/1987 | Samson et al. | |
| 4,704,959 A | 11/1987 | Scallen | |
| 5,271,317 A | 12/1993 | Aguerrevere et al. | |
| 5,947,016 A | 9/1999 | Repac et al. | |
| 6,129,234 A | 10/2000 | Culig et al. | |
| 6,209,439 B1 | 4/2001 | Repac et al. | |
| 6,401,605 B1 | 6/2002 | Repac et al. | |
| 6,409,107 B1 | 6/2002 | Romano | |
| 6,505,536 B2 | 1/2003 | Wilhelm | |
| 6,974,098 B2 | 12/2005 | Keller | |
| 7,017,843 B2 | 3/2006 | Romano | |
| 7,086,155 B2 | 8/2006 | Chan et al. | |
| 7,150,214 B2 | 12/2006 | Repac et al. | |
| D543,422 S | 5/2007 | Kaposi | |
| 7,302,887 B1 * | 12/2007 | Chapman et al. | 100/234 |
| 7,648,092 B2 | 1/2010 | Wong et al. | |
| 8,046,921 B2 | 11/2011 | Mastroianni | |
| 2009/0025575 A1 | 1/2009 | Lazaroff | |
| 2009/0272281 A1 * | 11/2009 | Hood et al. | 99/538 |

* cited by examiner

*Primary Examiner* — Dana Ross
*Assistant Examiner* — Brandon Harvey
(74) *Attorney, Agent, or Firm* — Warner Norcross & Judd LLP

(57) ABSTRACT

A culinary tool is provided including a handle and a housing that pivot relative to one another during a forward stroke of the handle to incrementally move, and optionally ratchet, a ram within the housing toward a cutting grid, thereby extruding food through the cutting grid. A cutting blade, joined with the handle distal from the pivot, travels along a blade path near the cutting grid to mince the extruded food. The blade can be joined with the handle at a cantilevered connection, and can be flexible so that as it moves along the blade path, a portion of the blade flexes to allow the blade to cut the extruded food material without binding as the blade moves across the cutting grid. The blade can include one or more sledded feet that project outwardly from the blade and that guide the blade near the cutting grid in a non-binding manner.

13 Claims, 15 Drawing Sheets

CULINARY EXTRUDING AND MINCING TOOL

BACKGROUND OF THE INVENTION

The present invention relates to a culinary tool that both extrudes and minces or cubes food materials, such as vegetables, fruits, herbs, cheeses and other foods.

Culinary tools that slice, grate or shred food have become staples in kitchens because they offer a timesaving alternative to manual food preparation. Such culinary tools are offered in multiple shapes and sizes, with many of them being in the form of electrically powered food processors. While such electrically powered processors are easy to use, they usually are designed for stationary use, and not portable, hand held operation. On the other hand, because of their portability and ease of use, hand held culinary tools continue to become more popular with food preparers, even though they are usually less powerful than electrically powered food processors.

There are a variety of hand held culinary tools that perform certain food processing operations, for example, slicing, grating, extruding or shredding. Some of these of these hand held tools even are equipped to perform multiple food operations. For example, one particular culinary tool is configured to both extrude and cube garlic. This culinary tool includes a cutting grid and a ram located in an inner part of a body. The inner part is threaded and the body includes a head. As the head is rotated multiple times around a head axis that is coincident with an axis of the ram, it engages the threads to push the ram toward the cutting grid, thereby extruding garlic through the cutting grid. The tool also includes a blade that is located near the cutting grid, and attached to the body. As the body is rotated, the blade rotates in a circle around the ram axis to cut garlic extruded through the cutting grid into cubes.

Although the above culinary tool is generally suitable to extrude and cube garlic, its operation is somewhat awkward due to the amount of manual rotation required to extrude and cube the garlic. In addition, because the blade is only about half as wide as the cutting grid, and sweeps in an arc around the rear axis, the size of the cubes it cuts can vary undesirably. Further, the tool itself is quite complicated, which can make cleaning and reassembly time consuming and frustrating. Accordingly, there remains room for improvement in the area of culinary tools that process food materials, that are easy to operate, and that are relatively uncomplicated for ease of operation and cleaning.

SUMMARY OF THE INVENTION

A culinary tool is provided including a handle and a housing that pivot relative to one another about a pivot during a forward stroke of the handle toward the housing to incrementally move a ram within the housing toward a cutting grid, thereby extruding a food material through the cutting grid. A cutting blade is joined with the handle distal from the pivot, and travels along a blade path over the cutting grid to mince the food material extruded through the cutting grid into smaller food pieces, for example, generally small cubes or parts.

In one embodiment, the handle and housing are elongated elements, positioned side by side one another and attached at a pivot. The side by side handle and housing can be grasped by a user and manually squeezed together to move the handle in a forward stroke toward the housing. During the forward stroke, the cutting grid can both extrude the food material, and the blade can move along the blade path to mince the extruded food material.

In another embodiment, the blade can be joined with the handle at a cantilevered connection. The blade also generally can be flexible so that as it moves along the blade path, a portion of the blade flexes to allow the blade to effectively cut the extruded food material without binding as the blade moves across the cutting grid.

In yet another embodiment, the blade includes a cutting edge that follows a blade path, optionally through several planes at several levels relative to the cutting grid (above, even with and/or below an output side of the cutting grid) as the blade flexes during a forward stroke of the handle, and as the blade moves toward and adjacent the cutting grid. Optionally, the blade can be constructed so that it urges or biases the cutting edge toward the cutting grid, generally keeping it close to the cutting grid throughout the forward stroke. Further optionally, the blade path can be perpendicular to a ram axis, and can traverse that ram axis.

In still another embodiment, the blade includes one or more sledded feet that projects outwardly, away from a primary portion of the blade. The sledded feet can be configured to engage a ramp on the housing and guide the cutting edge above the cutting grid, optionally without the aid of a closed track constraining upper and lower surfaces of the blade.

In still yet another embodiment, the handle can be joined with the blade, and the blade can travel along a blade path as the handle moves in a forward stroke. Along the blade path, a cutting edge of the blade can traverse the cutting grid from a first lateral side of the cutting grid along a generally linear path across the cutting grid toward a second opposing lateral side of the cutting grid. Optionally, the blade can generally be of the same or a greater width than the width of the cutting grid so as to mince all the extruded material.

In even another embodiment, the ram of the culinary tool can include one or more rack gears. The handle can include an indexing pawl that engages the rack gear as the handle is moved, optionally during a forward stroke. The indexing pawl can incrementally move or ratchet the ram in multiple preselected incremental distances toward the cutting grid to extrude food material therethrough.

In a further embodiment, the culinary tool can include a backlash pawl that is configured to engage a rack gear to prevent the ram from regressing away from the cutting grid after the forward stroke of the handle. This can hold the food material in place, generally under a constant pressure exerted by the ram. Optionally, the backlash pawl can also engage the ram in a ratchet-like manner in this regard.

In yet a further embodiment, the culinary tool can include a backlash pawl reset actuator that can selectively disengage the backlash pawl from the rack gear so that a user can remove the ram from the housing to load food material in the tool or to clean the tool or its components.

In still a further embodiment, the cutting grid of the culinary tool can be mounted to a frame. The frame can be removable from the housing for cleaning or service. The frame can generally be removable from the housing along a frame path that is generally perpendicular to a longitudinal axis of the ram. Optionally, the frame path can also be generally perpendicular to the travel path of the blade.

The culinary tool provided herein provides a portable, hand-held culinary tool that both extrudes and minces food material. The culinary tool is simple in construction yet reliable in operation, and is configured for easy storage. The culinary tool can incrementally move, and optionally ratchet, a ram toward a cutting grid to ensure the food material is consistently extruded through the grid. Where included, the blade of the culinary tool can glide adjacent the cutting grid to cleanly cut extruded material into generally uniformly sized minced parts, for example cubes or other food shapes. Where included, the sledded feet guide the blade adjacent the cutting grid without binding the blade.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

I. Overview

Figure 1:
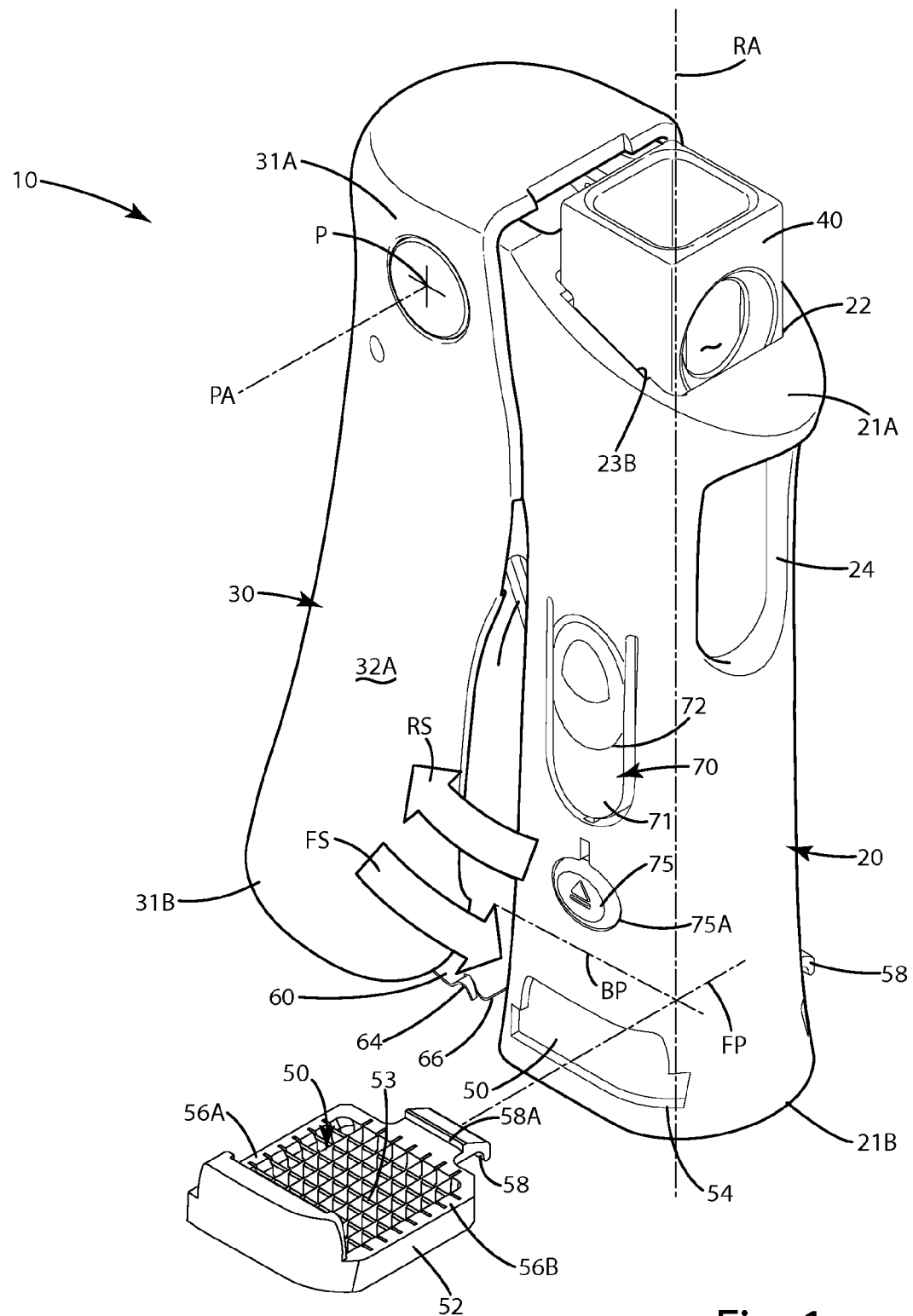
FIG. 1 is a top perspective view of a culinary tool of a current embodiment with a cutting grid removed.

A current embodiment of the culinary tool is illustrated in FIGS. 1-7 and generally designated 10. The culinary tool includes a housing 20 that is pivotally joined at a pivot P to a handle 30. The housing includes a chamber 22 that receives a ram 40. The ram 40 is disposed in the housing 20, and in particular, a chamber 22 defined by the housing. The housing 20 also includes a cutting grid 50 which is disposed at one end of the housing. The handle 30 is joined with a blade 60 that is at an opposite end of the handle from the pivot P. The ram 40 is disposed in the housing 20, and in particular, the chamber 22 of the housing.

In operation, a user exerts a user force UF and squeezes the housing 20 and handle 30 toward one another. These elements pivot about the pivot point P with a portion of the handle 30 distal from the pivot P, for example, the handle lower end 31B generally moving during a forward stroke FS toward the ram axis RA or generally toward the housing 20. During the forward stroke FS, an indexing pawl 80 joined with the handle engages a portion of the ram 40 to incrementally move the ram toward the cutting grid 50 along a ram path, which generally lays along and is aligned with the ram axis RA. Accordingly, food material 101 within the chamber 22 of the housing between the ram 40 and the cutting grid 50 can be extruded through the cutting grid 50.

During the forward stroke FS, the blade 60 attached to the second end 31B of the handle also slices through the food material extruded through the cutting grid 50 to form minced food parts or generally cubes of food. The blade 60 can move along a blade path BP that is perpendicular to the ram axis RA, generally traversing across the cutting grid 50 from one lateral side 56A of the cutting grid 50 to another opposing lateral side 56B of the cutting grid 50. The sledded feet 64 of the cutting blade 60 can guide the cutting edge 66 of the blade upward and satisfactorily over the cutting grid, and generally prevent binding of the blade as it moves along the blade path BP.

The backlash pawl 70 can impair or prevent the ram 40 from regressing away from the cutting grid 50 as the handle 30 undergoes a return stroke RS. This can keep a constant pressure on the food material 101 until the handle undergoes another forward stroke FS to further extrude the food material through the cutting grid and slice/mince the extruded material. During the return stroke RS, the handle moves away from the ram axis RA with the blade 60 likewise moving away from the ram axis RA and the cutting grid 50.

The culinary tool 10 described herein is well suited for a variety of different food materials. It can, for example, both extrude and mince or dice a variety of food materials such as vegetables, fruits, herbs, cheeses and other foods.

II. Construction

The various components of the culinary tool 10 will now be described in further detail. As shown in FIG. 1, the housing 20 is generally pivotally joined with the handle 30 at a pivot P. The pivot P can generally be coincident with a pivot axis PA. The housing 20 can include a pivot arm 27 that extends toward the handle 30. The pivot arm can define a bore that is coincident with an axle 27A when the axle is placed to join the housing 20 and the handle 30. The housing 20 can be constructed from an injection molded plastic or polymeric material. Alternatively, it can be constructed from metal or other suitable rubber, plastic or composite materials.

The housing 20 can generally be of an elongated shape. The outer contours can be selected to enhance a user's manual gripping of the housing 20 and handle 30. For example, finger grooves (not shown) can be included in the housing or other elements so that the housing and handle can be manually squeezed in a user's hand. The housing can include a top 21A also referred to as a first end or upper end, as well as a bottom 21B also referred to as a second or lower end 21A. The bottom 21B can be distal from the top 21A and distal from the pivot P.

Figure 2:
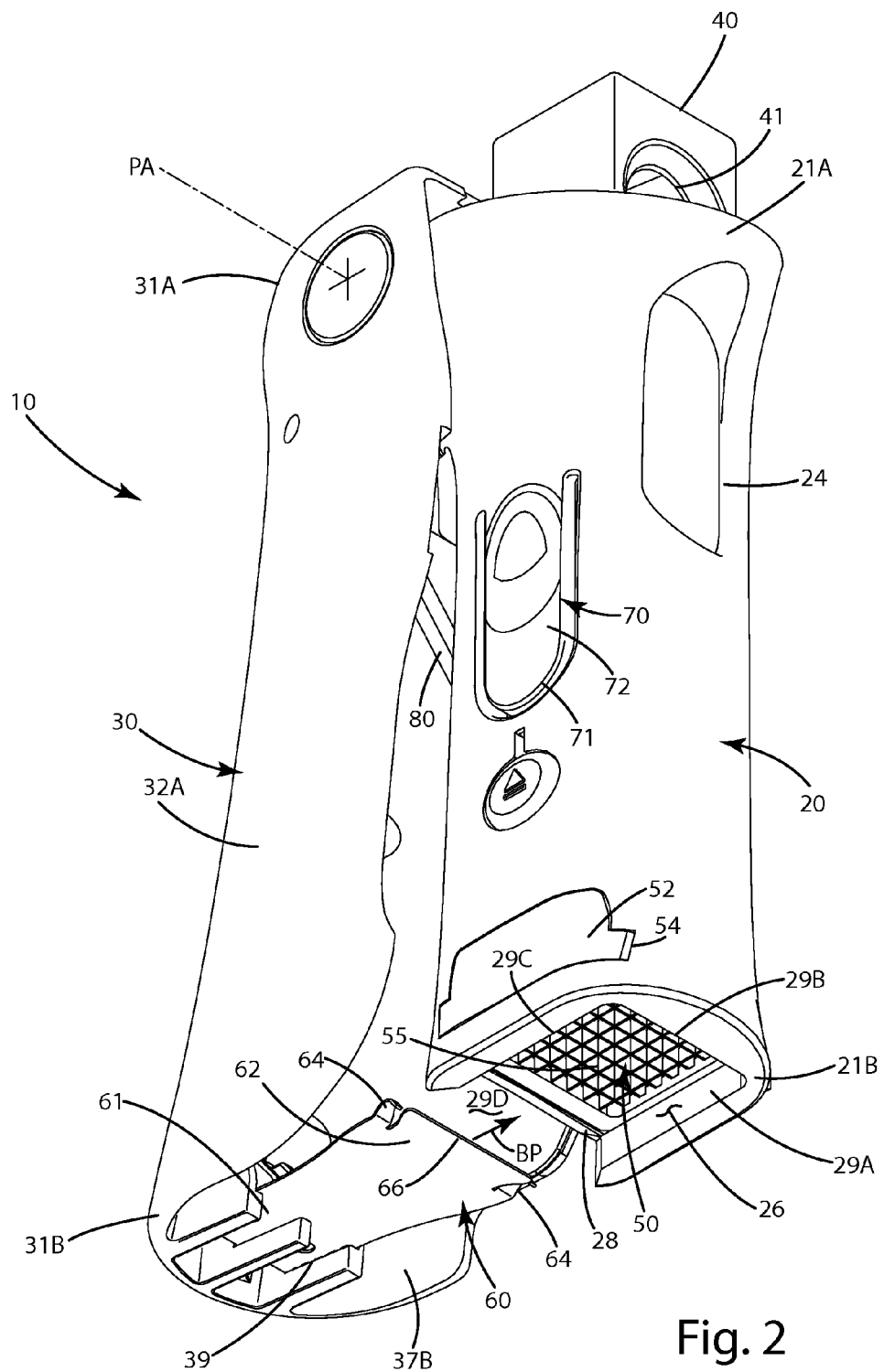
FIG. 2 is a bottom perspective view of the culinary tool illustrating a cutting grid and a blade.

As described below, the cutting grid 50 can be disposed at the bottom 21B. As shown in FIG. 2, the bottom 21B can define a bottom recess 26 that is immediately adjacent the cutting grid 50. The output side 55 of the cutting grid 50 can open directly to the recess 26. The recess 26 can be bound by front 29A and rear 29C, walls with a lateral sidewall 29B connecting these walls. The recess 26 can be open opposite the lateral sidewall 29B. Adjacent or in this opening 29D, a ramp 28 can be included with the housing 20. This ramp 28 can be angled and/or curved, concavely or convexly. The ramp, as described further below, can be configured to guide the blade 60, and more particularly, engage the sledded feet 64 so that the sledded feet ride up the ramp to position the cutting edge 66 of the blade 60 along a blade path BP, where the cutting edge 66 can engage and cut food material extruded through the cutting grid 50.

Adjacent the bottom 21B, the housing 20 also can define a cutting grid recess 54. The cutting grid recess 54 can be configured to open generally from a side of the housing 20. The cutting grid recess 54 can be oriented so that the cutting grid frame 52 can be inserted along a frame path FP (FIG. 1) that is perpendicular to the blade path BP. The frame path FP also can be perpendicular to the ram axis RA. With the blade path BP and frame path FP perpendicular, the cutting grid 50 can be trapped in the housing so that movement of the blade 60 across the cutting grid will not disengage the frame insert 52 and/or otherwise dislodge the cutting grid 50 from the housing 20. Put another way, the primary direction of movement of the blade 60 along the blade path BP is transverse and/or optionally perpendicular to the frame path FP along which the cutting grid frame 52 is removed from the housing 20. Again, this can prevent inadvertent removal of the cutting grid 50 from the housing 20 after repeated cutting operations. In some cases, the handle 30 can be constructed so that a portion of the handle, such as the front side 32A sweeps over the opening to the cutting grid insert recess 54 during the forward stroke FS of the handle, and then is removed from the front of the recess during the rearward stroke RS.

Optionally, the cutting grid 50 can include a locking tab 58 that engages the corresponding cutting grid snap hole 59 defined by the housing. The locking tab can include a shoulder 58A that engages a portion of the housing 20 to lock it in place within the housing.

The cutting grid 50 itself can include a cutting grid frame 54 to which the locking tab 58 is joined. The cutting grid can include an input side 55 which generally faces the chamber 22 defined by the housing and an output side 53 that generally faces outward from the housing 20. The cutting grid 50 can include multiple sharpened blades that are configured to extrude food material as it is pressed through the cutting grid. The cutting grid 50 also can include a first lateral side 56A and a second lateral side 56B. As described below, the blade edge 64 generally traverses across the cutting grid 50 from the first lateral cutting edge 56A toward the second lateral side 56B.

Figure 5:
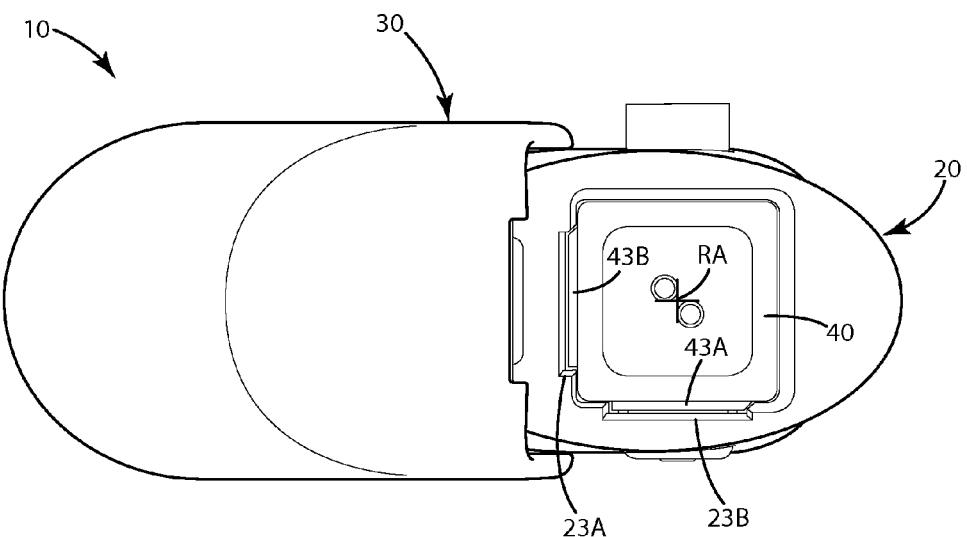
FIG. 5 is a top view of the culinary tool.

As illustrated in FIGS. 1, 2 and 5, the housing 20 generally defines a chamber 22. The chamber 22 extends longitudinally along the ram axis RA and itself includes a chamber axis that is coincident with the ram axis RA. The chamber 22 defined by the housing 20 can be generally square, but alternatively, can be round, elliptical, triangular or of other shapes depending on the particular application and the advancement characteristics of the ram 40 to extrude material through the cutting grid 50. The housing 20 can define recesses 23A and 23B adjacent the chamber 22. These recesses can be sized to accommodate the rack gears 43A and 43B of the ram 40. These indexing recesses 23A and 23B can be configured to align or index the ram 40 in a specific orientation relative to the respective indexing pawl 80 and backlash pawl 70 as described below. The indexing recesses 23A and 23B can be long enough to accommodate the entire length of the rack gears 43A and 43B, respectively, as those rack gears move with the ram 40 through the chamber 22 and/or as the ram moves toward the cutting grid 50. Generally, the chamber 22 can be long enough to accommodate substantially all of the ram 40.

Figure 8:
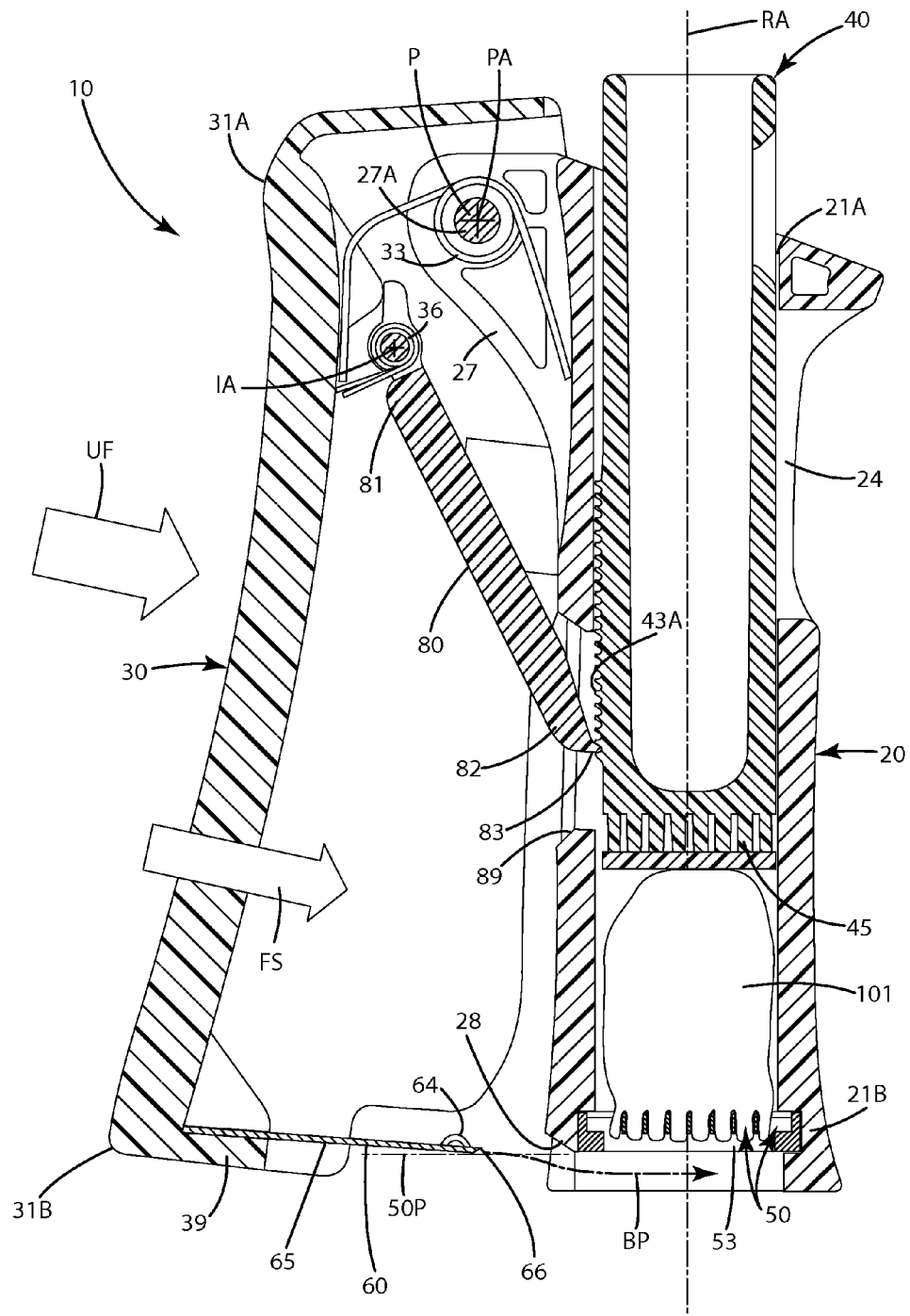
FIG. 8 is a side section view of the culinary tool as the handle begins to move in the forward stroke.
Figure 9:
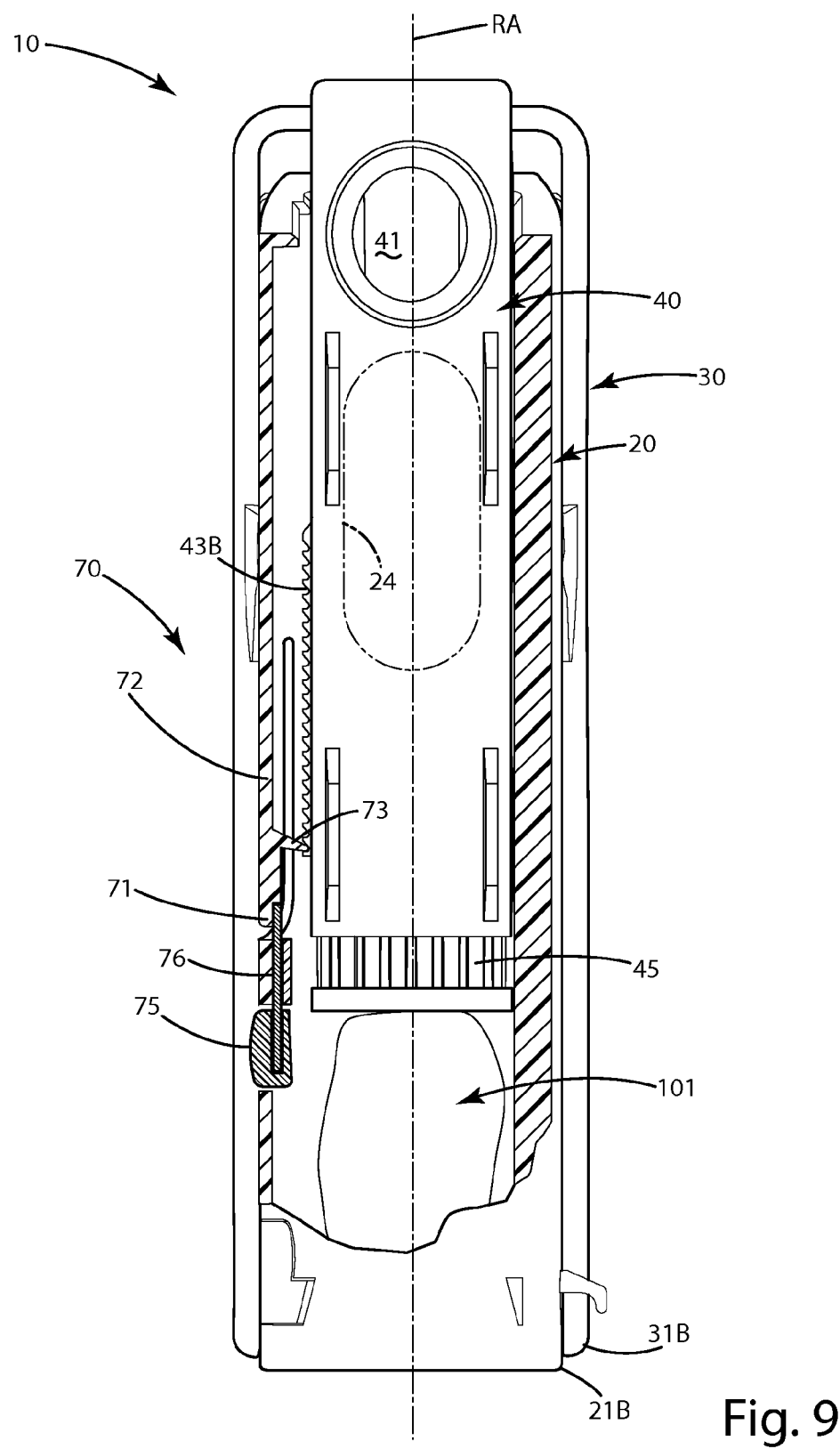
FIG. 9 is front partial section view of the culinary tool as the handle begins to move in the forward stroke, generally illustrating the action of a backlash pawl.
Figure 11:
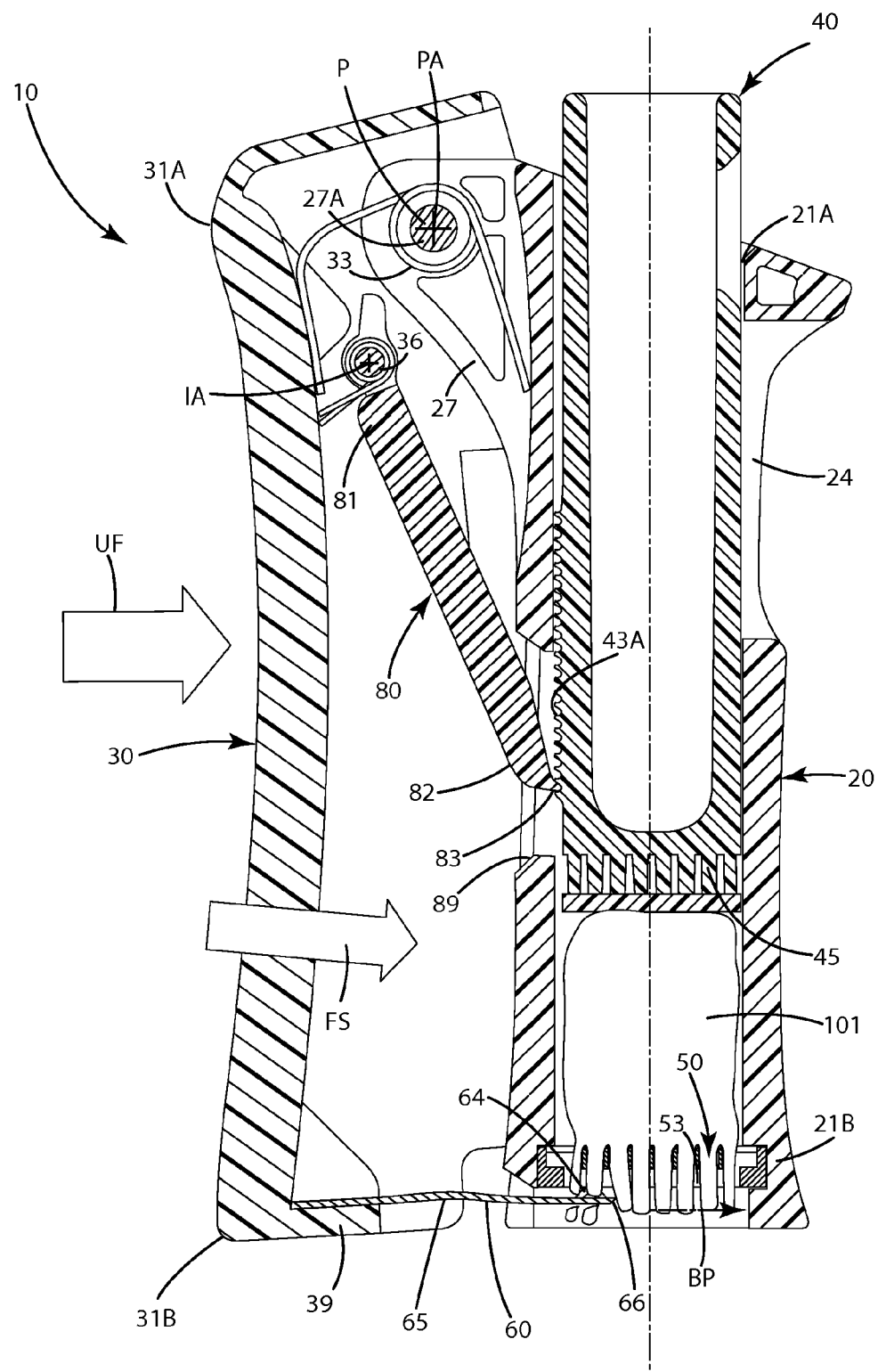
FIG. 11 is a side section view of the culinary tool as the handle continues to move in the forward stroke.

As shown in FIG. 8, the housing 20 can define a indexing pawl window 89 of sufficient size so that the indexing pawl as shown in FIG. 11 can project through the indexing window 89 and engage the rack gear 43A sufficiently to move and/or ratchet the ram 40. The specific length and size of the indexing pawl window 89 can be modified depending on the amount of travel of the ram 40 desired during a forward stroke FS of the handle 30.

The housing 20, as shown in FIGS. 1 and 2, can define a window 24 so that the ram 40 is viewable by a user operating the culinary tool 10. Accordingly, the user can determine the advancement of the ram and whether or not it is properly advancing, as well as the relative position of the ram 40. Generally, the window 24 defined by the housing can be of a sufficient size so that a user can insert a digit therethrough and into the hole 41 defined by the ram 40 to assist in removing the ram 40 from the chamber 22 when desired to clean or reload the tool 10.

Figure 12:
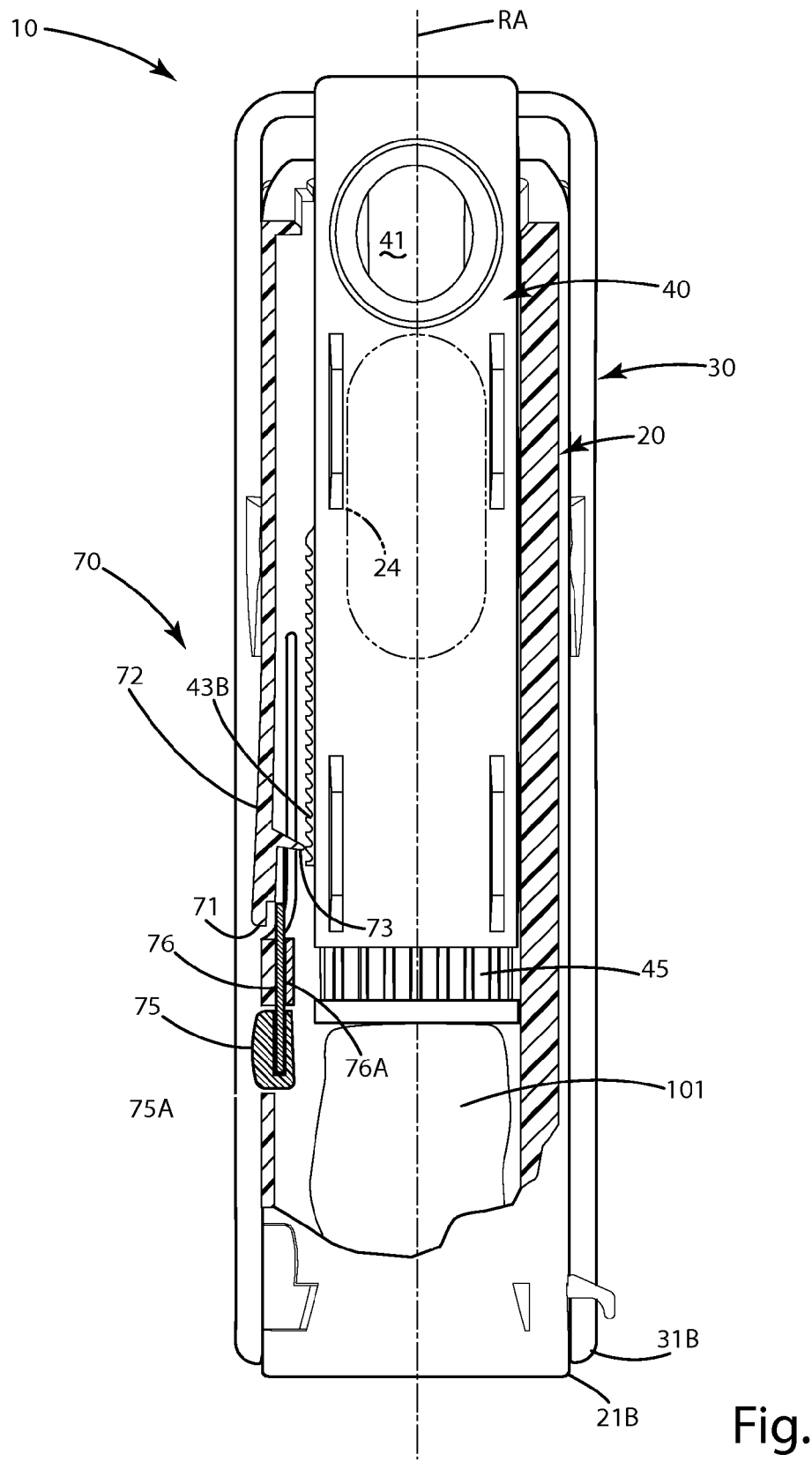
FIG. 12 is front partial section view of the culinary tool as the continues to move in the forward stroke, generally illustrating the action of a backlash pawl.

With reference to FIGS. 2, 3, 12, 15 and 16, the housing optionally includes a backlash pawl 70. The backlash pawl 70 can be in the form of a cantilevered finger 72 having a free end 71. The free end 71 can move relative to the exterior of the housing 20. The cantilevered finger 72 can include a tooth 73. The tooth 73 can be of a variety of geometric shapes and cross sections, for example, it can be triangular, semi-circular, rounded, polygonal or other geometric shapes. As shown in FIG. 12, the tooth 73 can be in the form of a triangle so that it can ride up and over the respective teeth of the rack gear 43B. As shown further in FIG. 15, the tooth also can effectively lock within the adjacent teeth of the rack gear 43B.

The backlash pawl 70 can be in communication with and/or joined with an actuator 75. As illustrated in FIGS. 9, 12, 15 and 16, this actuator 75 can be in the form of a reset button that can be manually depressed by a user to disengage and/or re-engage the tooth 73 of the backlash pawl 70 with the rack gear 43B. For example, the actuator 75 in the form of a button, can be positioned in an actuator hole 75A defined by the housing 20. The actuator 75 can be joined with a rod 76 that extends through a hole defined by the housing 76A as shown in FIG. 12. This rod 76 can further extend and engage the end 71 of the finger 72 of the backlash pawl 70. Although not shown, the rod hole 76A can include a fulcrum or other mechanism that enables the rod 76 to pivot. In so pivoting, or just by generally moving, the rod 76 can engage the end 71 of the finger 72 to move the end from the position generally shown in FIG. 15 to the position shown in FIG. 16. For example, a user may exert a manual pressure MP against the button 75 as shown in FIG. 16. This, in turn, moves the rod 76 which in turn engages the opposing end of the rod against the end 71 of the finger 72 to remove the tooth 73 from the respective rack gear 43B in the direction D. In turn, after the tooth 73 has been disengaged from the rack gear 43B, the ram 40 can be removed in direction R from the housing 20, and in particular, the housing compartment 22 for service, cleaning or simply reloading the culinary tool 10.

Turning now to FIGS. 1-5, the culinary tool 10 also can include a ram 40. In operation, the ram 40 moves along a substantially linear ram axis RA. This ram axis RA can be coincident with an axis of the chamber 22, and can generally lay along the path of the ram. The ram 40 can be square, but of course can be of other geometric configurations such as a circular, elliptical, triangular or other shapes depending on the particular application. As noted above, the ram 40 includes a first rack gear 43A and a second rack gear 43B. These rack gears 43A and 43B can be located on immediately adjacent sides of the ram 40, and can serve to operate as indexing features to properly align the ram along the ram axis RA so that the respective rack gears 43A and 43B can be engaged by respectively indexing pawl 80 and backlash pawl 70. The ram 40 as mentioned above can also include a hole 41, which can be configured to facilitate ease of grasping the ram 40 and removing it from the chamber 22. The hole 41 can generally be disposed near or adjacent the upper end 44A of the ram 40.

Figure 4:
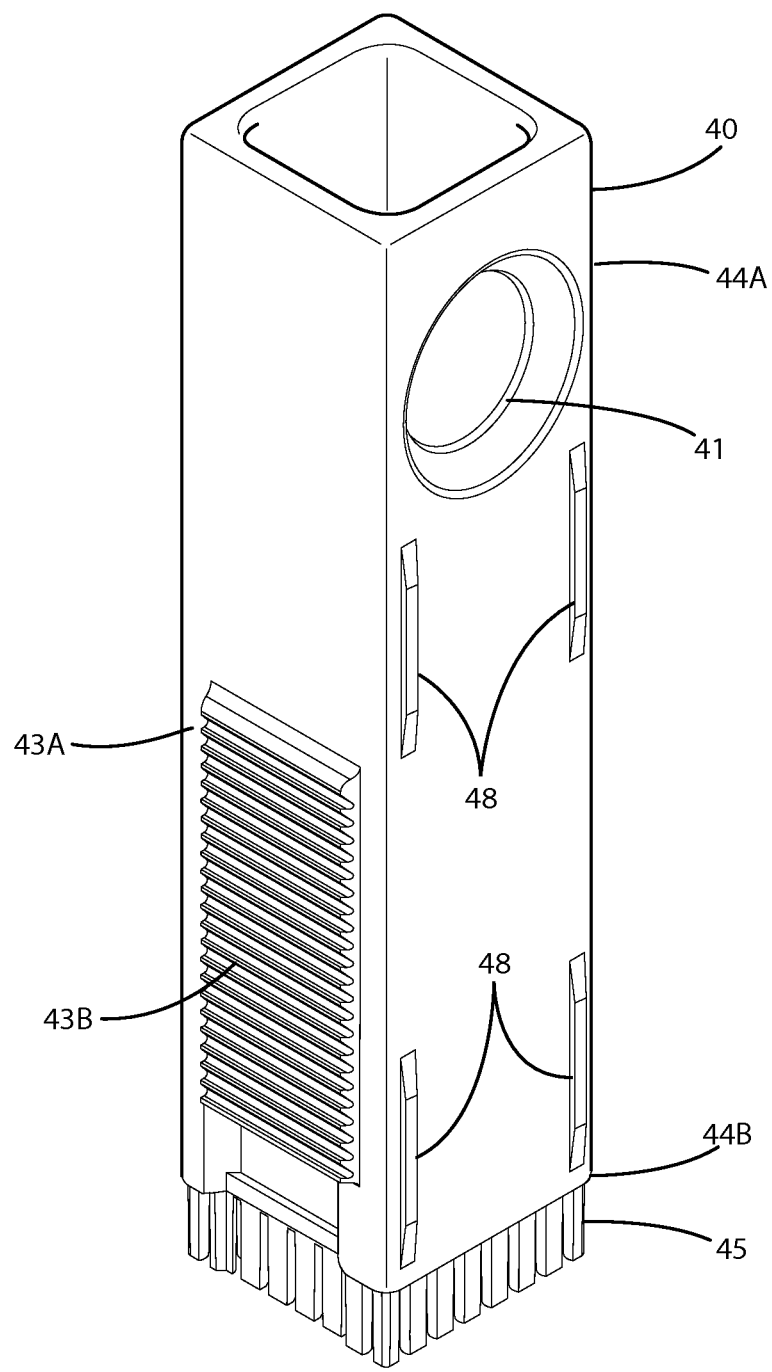
FIG. 4 is a top perspective view of the ram.

As shown in FIG. 4, the ram can be outfitted with a pushing grid 45 at its lower end 44B. The pushing grid 55 can generally be configured to fit through the apertures defined by the cutting grid 54. The pushing grid 55 can further be outfitted with a pushing plate and springs (not shown) if desired to facilitate movement of the last remnants of food material in the chamber 22 through the cutting grid 50.

Although shown as extending only along a portion of the sides of the ram 40, the rack gears 43A and 43B can extend along longer lengths of the sides. Generally, the rack gears 43A and 43B can be of a specific length so that when the pushing grid 45 has penetrated at least partially through the cutting grid 50 or at least through the input side 53 edging toward the output side 55 of the cutting grid 50, the rack teeth are past the end of the indexing pawl 80. Accordingly, the indexing pawl can no longer move the ram 40 downward, as this would possibly collide the bottom 44B of the ram with the cutting grid and cause damage to the blades thereof or otherwise loosen the cutting grid 50 from the housing 20.

Optionally, as shown in FIG. 4, the ram 40 can be outfitted with wear bars or guides 48 to assist in guiding the ram 40 in the chamber 22, or otherwise preventing unnecessary binding of the ram within the chamber 22.

Referring to FIGS. 1-5, the handle 30 can include an upper end 31A and a lower end 31B. The upper end 31A can be attached to the housing 20 at the pivot P. The lower end 31B can be distal from the pivot and can move in an arc about the pivot P as the handle 30 is moved in a forward stroke FS and/or rearward stroke RS. The handle 30 can be a generally hollow structure constructed from the same material as the housing. The front 32A and rear 32B sides of the handle can generally be distanced from one another so that they overlap portions of the housing 20 during the forward stroke FS of the handle 30 toward the housing 20. Of course, the front and rear sides of the portions of the handle 30 could be eliminated or altered in shape in different applications depending on the application.

Figure 3:
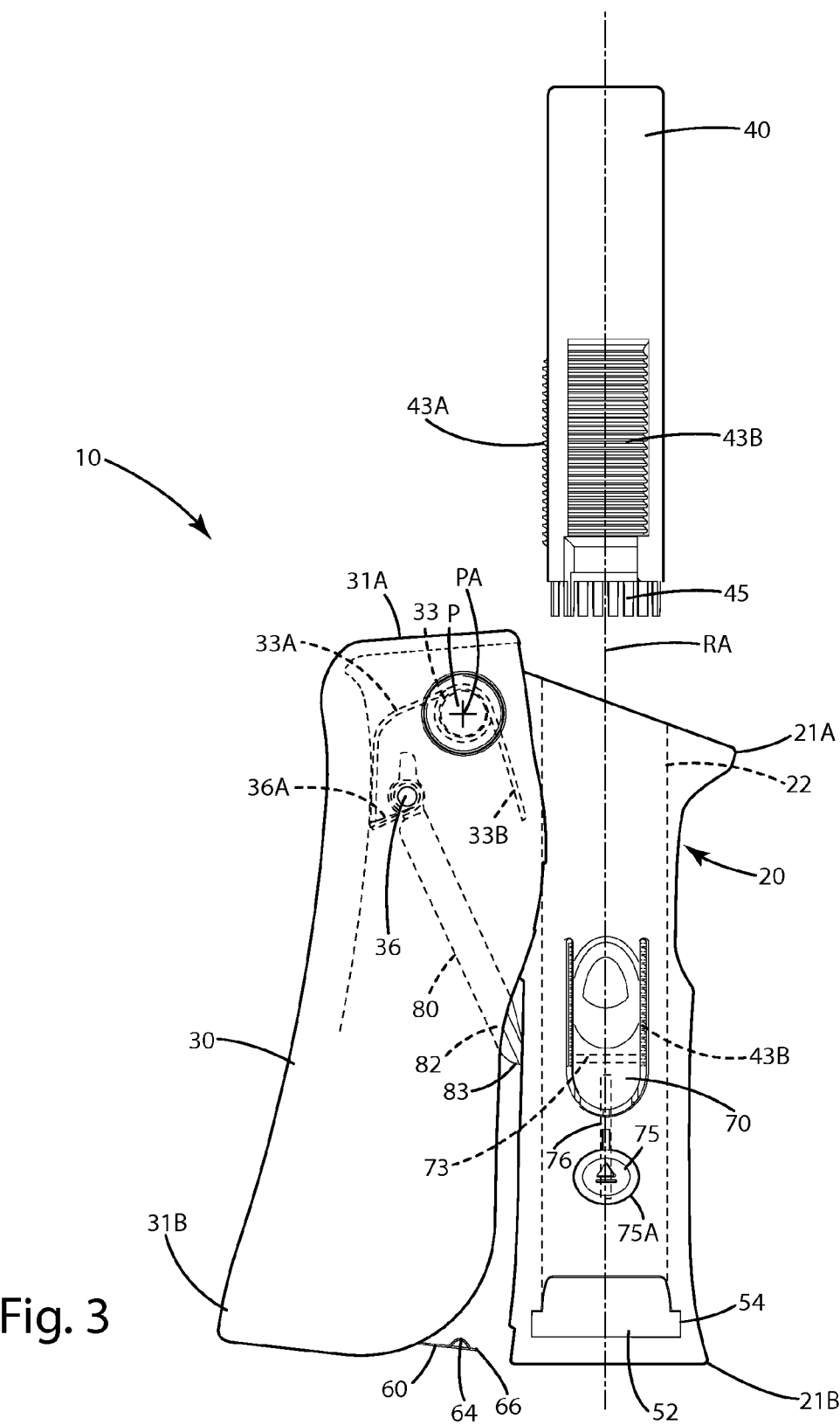
FIG. 3 is a side partial section view with a ram removed from a housing of the culinary tool.

As shown in FIGS. 3 and 8, the handle 30 is rotatable about the pivot P. The handle can further house a bias member or return spring 33 which optionally can at least partially encircle the pivot P. The return spring can include arms 33A and 33B that engage the portion of the handle 30 and a portion of the housing 20. The spring can exert a bias force to move the handle 30 away from the housing 20, and more generally away from the ram axis RA. With this construction and operation of the spring 33, the user generally must overcome the forces exerted by the spring on the handle with a manual squeezing action to move the handle 30. In turn, this squeezing action can rotate the remaining portion of the handle about the pivot P in a forward stroke FS, and generally move the bottom of the handle 31b toward the ram axis RA or more generally toward the housing 20. After the forward stroke FS of the handle 30, the spring 33 can urge the handle 30 away from the housing in the return stroke RS.

As further shown in FIG. 3, the handle can include an indexing pawl pivot axle 36. This indexing pawl axle 36 can be joined with the indexing pawl 80 at a first end 81 of the indexing pawl. A second or additional spring 36A can be coiled around at least a portion of the indexing pawl axle 36 to bias the indexing pawl 80 toward the ram axis RA so that it generally consistently engages the rack 43A when desired. Optionally, either of the springs 33 and 36A can be replaced with other biasing elements such as elastomeric elements, leaf springs and/or coil springs to provide similar movement or forces.

Referring to FIG. 8, the indexing pawl 80 can be joined with the handle 30 and pivotable about the indexing axis IA. The first end 81 of the indexing pawl 80 is joined directly with the axle 36 of the handle 30. As noted above, the spring 36A can urge the pawl 80 toward the ram 40 and more particularly the rack gear 43A. The second end 82 of the indexing pawl includes a tooth 83 which is configured and shaped to adequately engage the individual gear teeth in the rack gear 43A at a particular location. Optionally, the tooth 83 can be of generally triangular shape, but of course it can be rounded, semicircular, polygonal or of any other shape as depending on the particular application. The indexing pawl 80 generally is sized and shaped so that it can fit at least partially through the indexing pawl window 89 defined by the housing 20 as noted above. In operation the indexing pawl 80 can rotate about the indexing axis IA due to the secondary rotation of the handle 30 around the pivot axis PA. The indexing pawl 80 can also move linearly, generally parallel so that the tooth 83 generally moves parallel to the ram axis toward the bottom 21B of the housing in a forward stroke of the handle 30. In a rearward stroke RS, however, the pawl tooth 30 moves away from the bottom 21B of the housing and generally moves over the individual teeth formed in the rack gear 43A as described in further detail below.

Generally the indexing pawl 80 can be constructed from a rigid material, optionally a polymer such as molded plastic. Of course, it can be constructed from metal, resins, composites or other materials depending on the amount of force to be transferred through the handle to actuate the ram 40.

Figure 6:
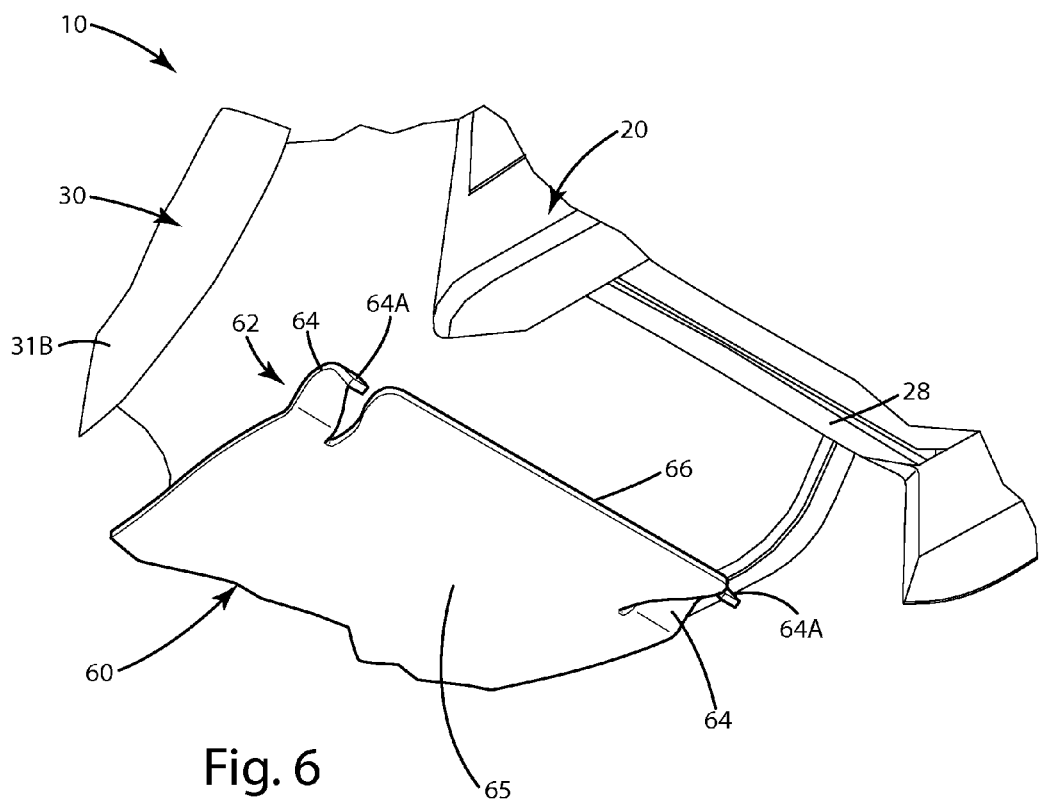
FIG. 6 is a close up perspective view of the blade.
Figure 7:
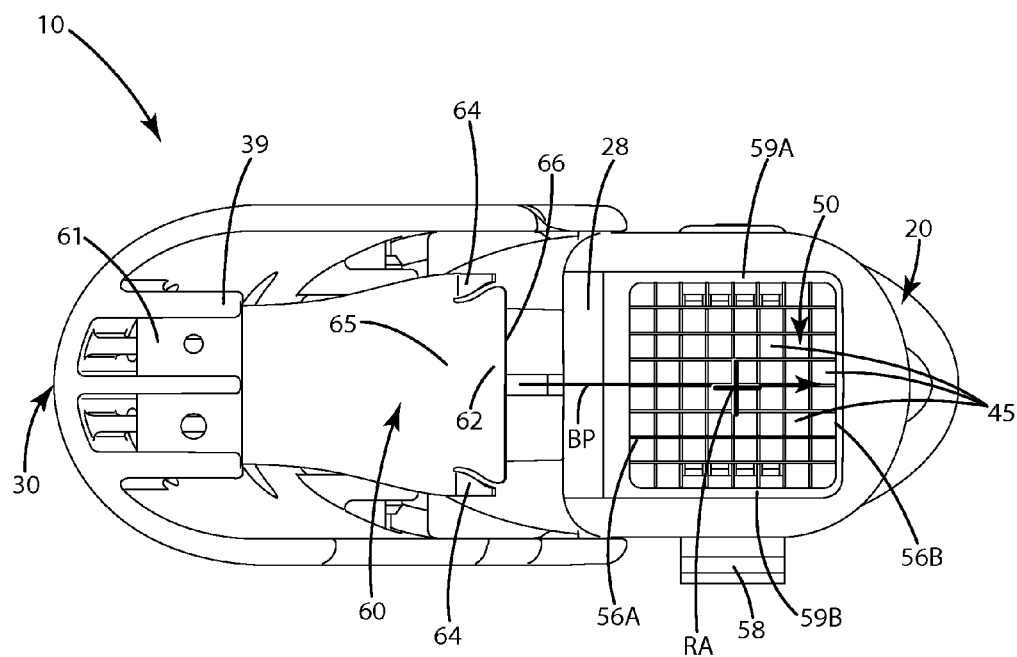
FIG. 7 is a bottom view of the culinary tool as the handle begins to move in a forward stroke.

As shown in FIGS. 2, 6 and 7, the handle 30 optionally can include a cantilevered connection 39 to join the blade 60 with the handle 30. This cantilevered connection 39 can be configured so that a first end 61 of the blade 60 is joined with the cantilevered connection, while the remainder of the blade including the second opposing end 62 extends away from the cantilevered connection in a cantilevered manner, and is generally free floating. The cantilevered connection 39 can include one or more flanges that capture and engage edges of the blade end 61 so that it is generally fixedly joined with the handle. Of course, although not shown, the handle 30 can include fasteners, such as set screws or other items, to enable the blade to be removed if desired.

Turning now to the blade 60, can be of a metal construction and can include a primary portion 65 that extends from the first end 61 to the second end 62. The primary portion can terminate at a cutting edge 66, which can include an edge sharpened to cut food material as described below. Optionally, the primary portion 65 can be constructed of a material or be of a sufficient cross section so that at least part of the primary portion can bend or flex. Accordingly, the blade can flex out of its initial orientation, and generally travel along the blade path BP shown in FIG. 8.

As shown in FIG. 6, optionally the blade 60 can include one or more sledded feet 64. The sledded feet can be disposed on opposing blade edges, at the opposing ends of the cutting edge 66. The sledded feet 64 can extend or project outwardly, away from the primary portion of the blade. The sledded feet 64 can project outwardly, away from the primary portion 65 of the blade toward the pivot P or more generally toward the top 21A of the housing and/or the top of the handle 31A. The sledded feet 64 can be formed as tabs that are simply bent from the primary portion downward. The sledded feet 64 can include forward portions that form ramps 64A, configured to engage and ride up the ramp 28 of the housing 20. When the handle undergoes a forward stroke FS, these sledded feet 64 can be of a sufficient width so that near the cutting edge 66, they are narrow and as they extend rearwardly away from the cutting edge, they expand in width. This in turn can enable the cutting edge 66 to be of a maximum width, yet still provide sufficient surface area for the ramps 64A to adequately engage the ramp 28 and/or the cutting grid 68. The particular contour of the ramp 64A, or other components or features of the sledded feet 64 themselves are nonfunctional. Indeed, the sledded feet and features can be of any geometric contour or configuration based on purely aesthetic design considerations.

In operation, the blade 60 travels along a blade path BP. As shown in FIG. 8, this blade path optionally is of a configuration that depends on the flexing of the primary portion 65 of the blade as the handle 30 moves toward the ram axis RA. Further, the blade path BP can be generally perpendicular to the ram axis RA at least as the cutting edge 66 moves adjacent the cutting grid 50. The blade path BP can be such that the cutting edge 66 and/or the sledded feet 65 move below the output side 53 of the cutting grid 50 before the sledded feet 64 engage the ramp 28. After the sledded feet 64 engage the ramp, the primary portion 65 of the blade bends or flexes and the sledded feet 64 convey or transition the cutting edge 66 parallel to the ramp, upward away from the original plane in which the blade was orientated before the forward stroke began. The cutting edge 66 can continue generally in a plane parallel to the output side 53 of the cutting grid 50 as the sledded feet 64 slide across and adjacent that output side 53 of the cutting grid 50.

Due to the arc movement and rotation of the bottom 31B of the handle 30 about the pivot axis PA throughout this movement, the primary portion 65 can bend or flex, more or less, to generally keep the cutting edge 66 moving along and/or adjacent the output side 53 cutting grid 50. The cantilevered configuration of the blade can facilitate movement of the blade 60 and cutting edge 66 along a blade path BP that moves in multiple planes and levels, and through a tortuous path when viewed from the side of the culinary tool 10.

The blade 60 can be configured so that it effectively travels along a blade path BP that is substantially perpendicular to the ram axis RA and traverses from one lateral side 56A transversely across the cutting grid 50 toward an opposite lateral side 56B. Further, the cutting edge 66 can move throughout the forward stroke FS at varied distances from the pivot axis PA and/or the ram 40. Optionally, the cutting edge 66 can be at least as wide as the cutting grid 50, so that the cutting edge 66 minces substantially all the food material extruded by the cutting grid 50 as explained in further detail below.

III. Operation

Operation of the culinary tool 10 of the current embodiment will now be described with reference to FIGS. 1, 3 and 6-16. To begin, as shown in FIG. 3, the culinary tool 10 can be manipulated by a user to remove the ram 40 from the chamber 22 of the housing 20. With the ram 40 removed, an article of food 101 as shown in FIG. 8 can be positioned in the chamber 22. The food material 101 can be any of the food materials described herein. After the food material 101 is inserted in the chamber 22, the ram 40 is inserted into the chamber 22 and moved toward the cutting grid along the ram axis RA. As described above, the respective rack gears 43A and 43B assist the user in indexing those rack gears 43A and 43B with the corresponding recesses 23A and 23B so that the ram is properly oriented and can interact with the respective indexing pawl 80 and backlash pawl 70. The user then continues to move the ram downward into the chamber to engage the food material 101. In so doing, the rack 43A is generally aligned with the indexing pawl window 89. Accordingly, when the handle 30 is later actuated, it can sufficiently engage the rack gear 43A and move the ram 40 toward the cutting grid 50. Likewise, the rack gear 43B can be sufficiently aligned and optionally engaged by the backlash pawl 70, and in particular, the tooth 73 of the backlash pawl can engage one or more of the teeth on the rack gears 43B.

Turning to FIGS. 1, 3 and 8, the handle 30 can be held in an open position via the spring 33. The indexing pawl 80 can also be oriented so that the indexing pawl tooth 83 is near or perhaps engaging the rack gear 43A as shown in FIG. 8. The indexing pawl spring 36A can also urge the indexing pawl 80 and the indexing tooth 83 into optional engagement with the rack gear 43.

With the ram 40 inserted, and the food material 101 generally adjacent the cutting grid 50. The user can grasp the culinary tool 10 in one or both hands and apply a squeezing pressure to squeeze the handle 30 toward the housing 20. Incidentally, although the handle is described as moving toward the housing 20 herein, these elements may also generally move toward one another. Nonetheless, even during this mutual movement toward one another, the handle 30 is still generally considered to be moving toward the housing 20.

As the user applies a user force UF to overcome the force of the spring 33, the handle 30 begins to move in a forward stroke FS as shown in FIGS. 1 and 8. In so doing, the handle and/or housing pivot about the pivot axis PA and generally about the pivot P. The portion of the housing adjacent the pivot P, for example, the upper end 31A of the housing generally does not move much relative to the pivot P. However, the lower end or bottom 31B of the housing begins to move in a simple or compound arc, depending on the particular configuration of the pivot P. In this manner, at least a portion of the handle 30, for example, the bottom 31B begins to move toward the housing 20 and generally toward the ram axis RA and/or cutting grid 50.

With reference to the bottom view of the tool 10 in FIG. 7, during the initial portion of the forward stroke FS, the blade 60 is attached to the handle 30 and generally beginning to move along the blade path BP toward the first lateral side 56A of the cutting grid 50. As further shown in FIG. 8, the cutting edge 66 and generally the blade 60 also can be disposed below the plane or level of the cutting grid 50, and in particular, the cutting grid plane 50P during this initial portion of the forward stroke FS. If desired, the primary portion 65 of the blade 60 can be bent and/or optionally cantilevered at the cantilevered connection 39 somewhat upward to provide this configuration. In addition, referring to FIG. 9, the backlash pawl 70 may be configured such that the backlash finger 72 engages the backlash tooth 73 at some location along the rack gear 43B, optionally between adjacent rack gear teeth in the rack gear 43B.

Referring further to FIG. 8, in the first portion of the forward stroke FS, the indexing pawl 80, and in particular, the indexing pawl tooth 83 can engage the ram 40 at a location on the rack gear 43A. Accordingly, the ram 40 begins to move toward the cutting grid 50 along the rack axis RA. As a result, the food material 101 begins to be pushed through the cutting grid 50. In so doing, the sharpened blades of the cutting grid can begin to cut into the food material and extrude it into multiple individual, adjacent strings of food material.

Figure 10:
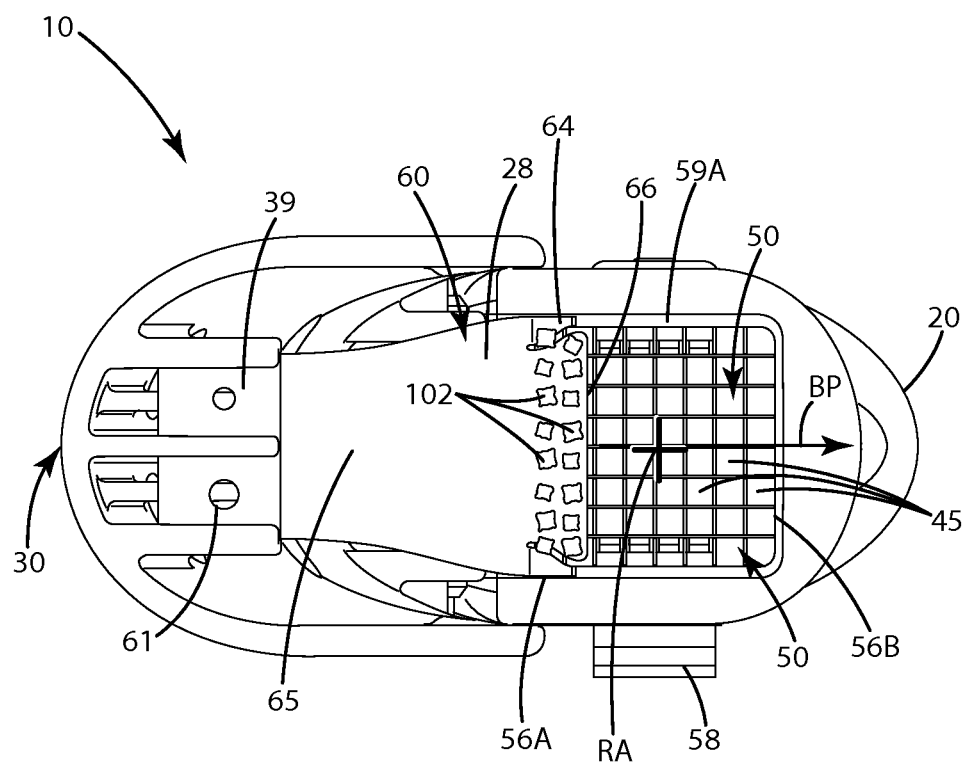
FIG. 10 is a bottom view of the culinary tool as the handle continues to move in the forward stroke.

Referring now to FIGS. 10-12, as the user continues to exert a user force UF on the handle 30 and move the bottom 31B of the handle toward the ram axis RA and cutting grid 50, the blade 60 begins to move further along the blade path BP. The sledded feet 64 of the blade can engage the ramp 28 of the housing (FIG. 6) to guide the cutting edge 60 and a portion of the blade 60 upward, so that it is generally configured to slide across and adjacent the cutting grid 50. During this movement, and approach of the sledded feet 64 on the ramp 28, the primary portion 65 of the ramp can flex or bend. This flexing and/or bending can also enable the blade 60 to exert a force so that the cutting edge 66 is kept close to the output side 53 of the cutting grid 50. Put another way, the interaction of the connection member 39 with the blade 60 can exert a spring like or biasing force, which urges the sledded feet 64 and/or cutting edge 66 toward the cutting grid 50 as the cutting edge 60 traverses the cutting grid 50.

Referring to FIG. 11, this bias can be illustrated by the slight bow shown in the blade 60 generally in the primary portion 65 of the blade. As also shown there and in FIG. 10, when the blade 60 begins to move across the cutting grid 50, and in particular, the output side 53 of the cutting grid, the sledded feet 64 can engage the cutting grid 50 and/or a portion of the recess 26 defined in the bottom of the housing 20. Optionally, the recess 26 does not include a track that linearly constrains the cutting edge 66 or end 62 of the blade 60. As the cutting edge 60 moves across the cutting grid 50 from one lateral side 56A toward the opposing lateral side 56B, it begins to cut the extruded strings of food material into smaller pieces 102. These pieces 102 can fall from the culinary tool 10 into a designated container (not shown).

With reference to FIG. 12, as the ram continues to move along the ram axis RA, the backlash pawl 70, and in particular, the backlash pawl tooth 73 rides, slides or moves over the corresponding teeth in the rack gear 43B so that tooth 73 does not hinder this movement. To do so, the backlash pawl finger 72 resiliently flexes outward in cantilevered fashion to facilitate the movement of the rack gear 43B relative to the backlash pawl tooth 73.

Figure 13:
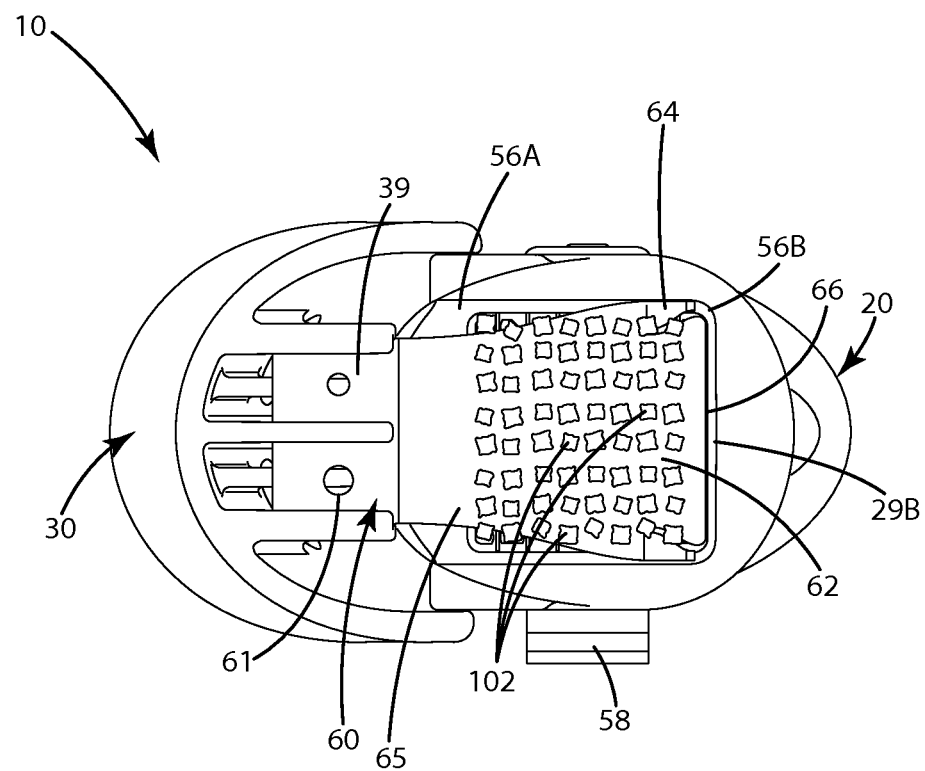
FIG. 13 is a bottom view of the culinary tool as the handle reaches an end of the forward stroke.
Figure 14:
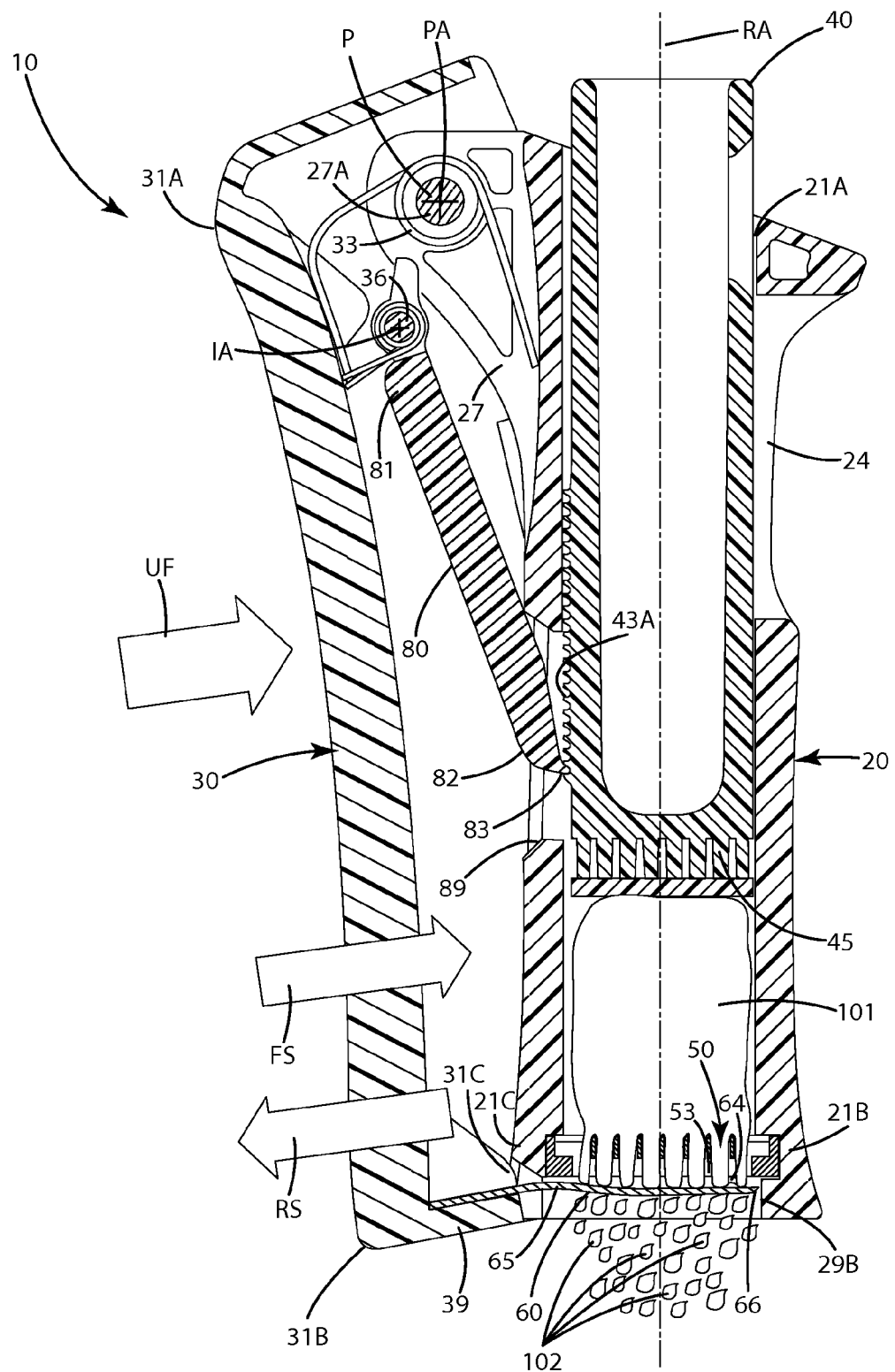
FIG. 14 is a side section view of the culinary tool as the handle reaches an end of the forward stroke.
Figure 15:
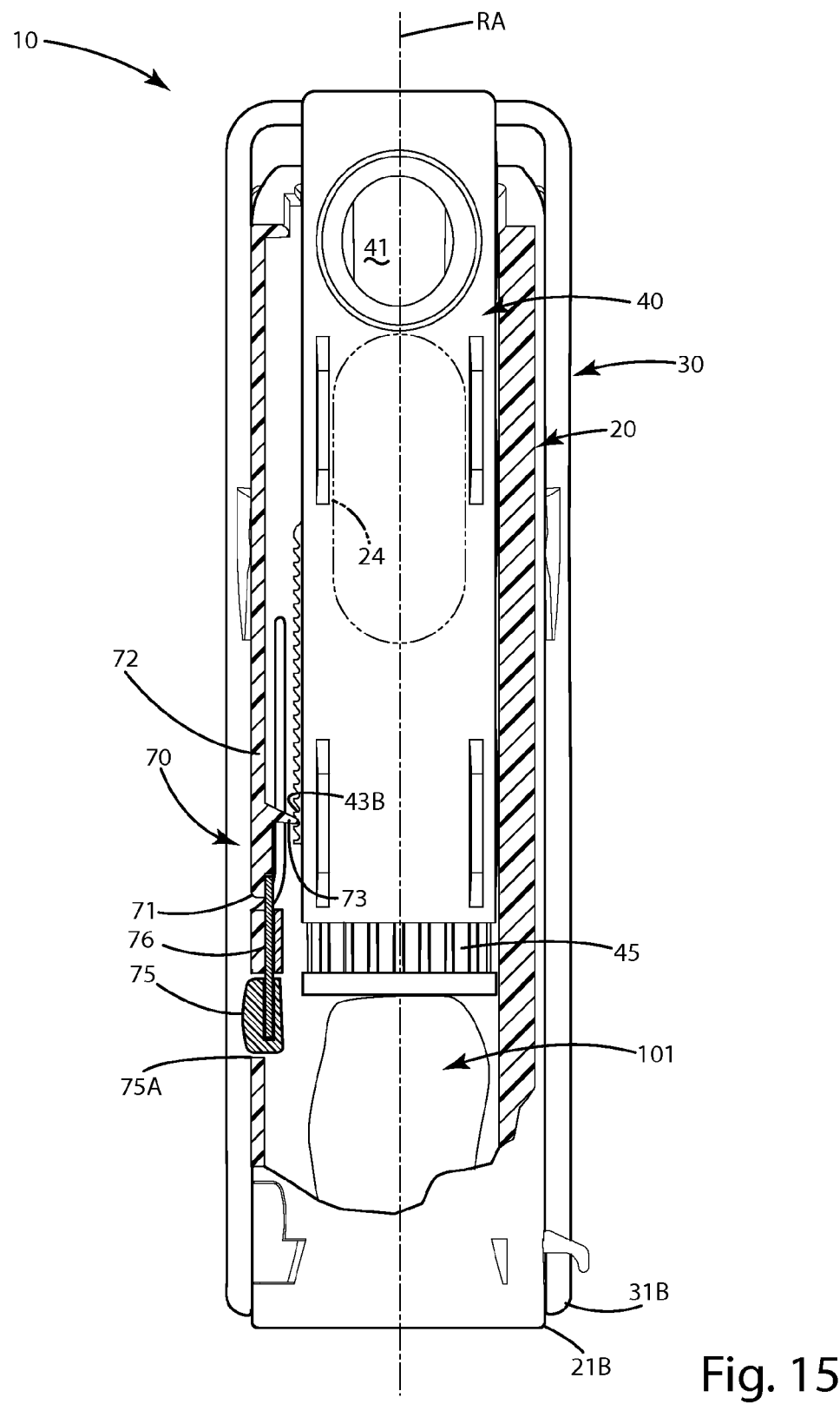
FIG. 15 is front partial section view of the culinary tool as the handle reaches an end of the forward stroke, generally illustrating the action of a backlash pawl.
Figure 16:
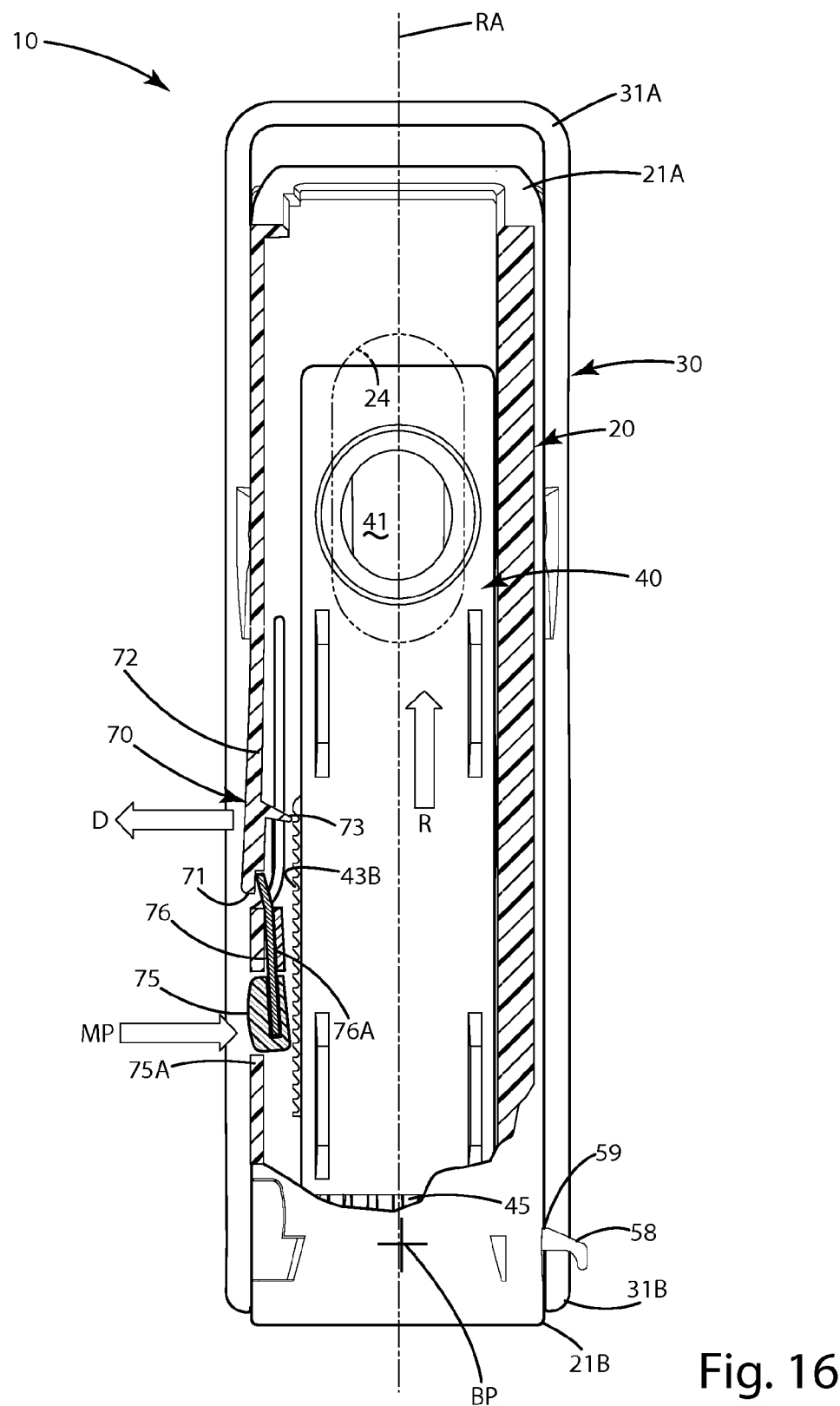
FIG. 16 is front partial section view of the culinary tool as an actuator resets the backlash pawl so that the ram can be removed from the housing.

With reference to FIGS. 13-15, the continued forward stroke FS of the culinary tool will be described. As illustrated, the blade 60, and more particularly, the cutting edge 66 is moved substantially across the cutting grid 50 adjacent the output side 53 of the grid. In so doing, the cutting edge 66 continues to cut and thereby mince the food material 101 extruded through the cutting grid into smaller cubes or pieces 102. The sledded feet 64 also continue to slide across the cutting grid 50, generally within the recess 26 of the housing 20. Further, the ram 40 continues to move along the ram axis RA, generally toward the cutting grid, thereby pushing the food material 101 so that it is extruded into extruded parts through the cutting grid 50. Those parts are ejected from the cutting grid 50 on the outside face 53 of the cutting grid 50.

As shown in FIG. 13, the blade 60 can travel along the blade path BP during the last portion of the forward stroke FS as the user force UF (FIG. 14) is applied. The cutting edge 66 can stop adjacent the lateral side 29B of the housing 20. Optionally, the precise location of where the cutting edge 66 stops can be limited by the size of the indexing pawl window 89, the length of the indexing pawl 80, and/or the configuration and length of the rack gear 43A. Further optionally, the forward stroke FS of the handle 30 toward the housing 20 can be interrupted by engagement of the handle stop 31C with a stop portion 21C of the housing 20 as shown in FIG. 14. Upon this engagement, the handle effectively can be bottomed out against the housing to stop any further movement of the ram along the ram axis RA as well as the blade 60 along the blade path BP.

As shown in FIG. 14, in the last portion of the forward stroke FS, the handle 30 can continue to pivot about the pivot P generally with a portion of the handle 30 moving toward the housing 20, ram 40 and/or the ram axis RA. More particularly, the second end or bottom of the handle 31B can continue to move toward the ram axis RA, the cutting grid 50 and/or the housing 20. In this movement, the blade may continue to flex, for example, in the primary portion 65, optionally adjacent the cantilevered connection 39. Further, with this flexing, and in conjunction with the cantilever connection 39, the blade 60 can generally be urged so that the cutting edge 66 remains near or close to the cutting grid 50, even as food material is extruded through the cutting grid 50 above the blade 60. Further, the sledded feet 64 can continue to ride across the cutting grid 50 and/or a portion of the recess 26 defined by the housing.

As shown in FIG. 14, after the forward stroke FS stops, the user can cease squeezing the handle 30 and housing 20 toward one another via the user force UF. In so doing, the user can generally release the handle portion and allow the spring 33 to transition the handle 30 to a rearward stroke RS. The spring 33 can continue to "open" the handle 30 relative to the housing until it attains the configuration shown in FIG. 3.

Optionally, as shown in FIG. 15, during the rearward stroke RS, or generally during or after the forward stroke FS, the backlash pawl 70 can exert a resilient force to move the backlash tooth 73 into engagement with a location on the ram, for example, with the teeth of the rack gear 43B. The backlash tooth 73 can effectively engage and hold the ram 40 in place as the rearward stroke RS occurs or generally as the indexing pawl 80 disengages the other rack gear 43A. In turn, this engagement can impair or prevent the ram 40 from regressing or moving away from the cutting grid 50. This can be helpful to keep a constant pressure on the food material 101 so that it efficiently extrudes through the cutting grid 50. The backlash pawl 70 engagement with the ram also can minimize the number of strokes required to mince a particular food material with the culinary tool 10.

During the rearward stroke RS of the handle 30, the blade 60 also reverses its movement along the blade path BP as shown in FIGS. 8 and 11. For example, the blade 60, and in particular, the sledded feet 64 also move across the cutting grid 50, laterally from lateral side 56B toward lateral side 56A, and down the ramp 28 so that a portion of the blade 60, and more particularly, the cutting edge 66 moves back above the cutting grid plane 50P as shown in FIG. 8.

The user of the culinary tool 10 can repeat the above procedure by applying a user force UF multiple times to provide multiple forward strokes FS, thereby extruding and mincing food material through the cutting grid 50 with the cutting blade 60.

Optionally, the ram 40 can cease to move toward the cutting grid 50 along the ram axis RA after the rack gear 43 is sufficiently past the indexing pawl 80 so that the indexing pawl tooth no longer can sufficiently engage that rack gear and move the ram. If desired, an alternative construction can be implemented to simply bottom out the ram against the cutting grid or otherwise restrict movement of the handle after the ram has reached its limits.

After the food material 101 has been extruded and minced optionally into smaller parts 102, the ram 40 can be removed from the housing 20. To do so, as shown in FIG. 16, the user can apply a manual pressure MP against the actuator 75. In turn, this moves the rod 76, which moves the backlash tooth 73 and more generally the backlash finger 72 in direction D. The backlash tooth 73 thereby disengages the rack gear 43B. Accordingly, the user can apply a removal force R to remove the ram 40 along the ram axis RA from the housing 20. If desired, the user can also engage the hole 41 with a digit to assist in this removal. The user can reload the chamber 22 with more food material, or the user can clean the chamber and the cutting grid for storage and use at a later time.

With regard to cleaning the cutting grid, as shown in FIG. 1, the cutting grid can be pulled from the cutting grid recess 54 along the frame path FP and cleaned. After cleaning, it can be re-inserted into the recess and snap-fit in place as described above.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A culinary tool comprising:
   a housing;
   a ram having a longitudinal ram axis, the ram disposed in the housing and moveable along a ram path;
   a cutting grid positioned at an end of the ram path;
   an elongated handle pivotally joined with housing at a pivot; and
   a blade joined with the handle distal from the pivot;
   wherein the handle is moveable along a forward stroke in which the handle incrementally moves the ram toward the cutting grid along the ram path,
   wherein the handle pivots about the pivot, and at least a portion of the handle moves generally toward the ram axis during the forward stroke,
   wherein the blade moves along a blade path that is adjacent the cutting grid during the forward stroke of the handle,
   wherein the blade is connected to the handle so the blade moves with the handle during the forward stroke of the handle,
   whereby the blade minces a food material extruded by the cutting grid during the forward stroke of the handle,
   wherein the housing includes a backlash pawl that selectively engages the ram to prevent the ram from regressing away from the cutting grid after the forward stroke of the handle.

2. The culinary tool of claim 1 wherein the handle is moveable along a return stroke, wherein a bias element engages the handle to urge the handle generally away from the ram axis during the return stroke.

3. The culinary tool of claim 1 wherein the blade is joined with the handle at a cantilevered connection so that the blade is adapted to flex away from the pivot as the blade traverses the cutting grid, whereby the blade moves generally adjacent an output side of the cutting grid during the forward stroke.

4. The culinary tool of claim 1 wherein the handle is joined with an indexing pawl, the indexing pawl configured to engage a first rack gear to move the ram toward the cutting grid during the forward stroke of the handle.

5. A culinary tool comprising:
   a housing;
   a ram having a longitudinal ram axis, the ram disposed in the housing and moveable along a ram path;
   a cutting grid positioned at an end of the ram path;
   an elongated handle pivotally joined with housing at a pivot; and
   a blade joined with the handle distal from the pivot;
   wherein the handle is moveable along a forward stroke in which the handle incrementally moves the ram toward the cutting grid along the ram path,
   wherein the handle pivots about the pivot, and at least a portion of the handle moves generally toward the ram axis during the forward stroke,
   wherein the blade moves along a blade path that is adjacent the cutting grid during the forward stroke of the handle,
   wherein the blade is connected to the handle so the blade moves with the handle during the forward stroke of the handle,
   whereby the blade minces a food material extruded by the cutting grid during the forward stroke of the handle,
   wherein the ram includes a first rack gear on a first side of the ram and a second rack gear on an immediately adjacent second side of the ram,
   wherein the handle is joined with an indexing pawl, the indexing pawl configured to engage the first rack gear to move the ram toward the cutting grid during the forward stroke of the handle,
   wherein the housing includes a backlash pawl, the backlash pawl configured to engage the second rack gear to maintain the ram in a generally fixed position after the forward stroke, and before another forward stroke.

6. The culinary tool of claim 5 comprising a backlash pawl reset actuator that is manually moveable to disengage the backlash pawl from the second rack gear, whereby the ram can be removed from the housing.

7. The culinary tool of claim 1,
   wherein the cutting grid is joined with a cutting grid frame,
   wherein the cutting grid frame is located in a cutting grid frame recess defined by the housing,
   wherein the cutting grid frame is removable from the cutting grid frame recess along a frame path, and wherein the frame path is generally perpendicular to the blade path, and generally perpendicular to the ram axis.

8. A culinary tool comprising:
a housing defining a chamber;
a ram moveable within the chamber;
a cutting grid disposed at an end of the chamber, the cutting grid including an input side facing the chamber and an opposing output side, the cutting grid configured to extrude food material pushed through the cutting grid;
a handle pivotally joined with the housing at a pivot, the handle moveable along a forward stroke generally toward the housing, the handle also moveable along a return stroke generally away from the housing;
an indexing pawl joined with the handle, the indexing pawl extending toward and selectively engaging the ram at a first location; and
a blade joined with the handle distal from the pivot,
wherein the forward stroke of the handle pivots the handle about the pivot with the indexing pawl engaging the ram at the first location so that the ram pushes food material within the chamber through the cutting grid so as to produce extruded food material,
wherein the forward stroke of the handle moves the blade along a blade path adjacent the output side of cutting grid so as to slice the extruded food material to produce minced food parts;
whereby the culinary tool both extrudes material with the cutting grid and minces food material with the blade,
wherein a backlash pawl joined with the housing, the backlash pawl extending toward and selectively engaging the ram at a second location,
wherein the backlash pawl engages the ram at the second location after the forward stroke of the handle to selectively impair the ram from moving away from the cutting grid.

9. The culinary tool of claim 8 wherein blade includes a primary blade portion and a cutting edge, wherein the cutting edge is at least as wide as the cutting grid so that the cutting edge can slice through the extruded material to produce the minced food parts.

10. The culinary tool of claim 8 wherein the ram includes first and second rack gears located on adjacent sides of the ram.

11. The culinary tool of claim 8 wherein the backlash pawl is joined with the housing in a cantilevered manner so that the backlash pawl can flex to selectively engage and disengage the ram.

12. The culinary tool of claim of claim 8 wherein the blade is connected to handle at a cantilevered connection, wherein the blade includes a cutting edge, wherein during the forward stroke of the handle, the blade flexes so that the cutting edge moves, from a first level that is even with or above a cutting grid plane of the cutting grid, to a second level below the cutting grid plane.

13. A culinary tool comprising:
a housing defining a chamber;
a ram moveable within the chamber;
a cutting grid disposed at an end of the chamber, the cutting grid including an input side facing the chamber and an opposing output side, the cutting grid configured to extrude food material pushed through the cutting grid;
a handle pivotally joined with the housing at a pivot, the handle moveable along a forward stroke generally toward the housing, the handle also moveable along a return stroke generally away from the housing;
an indexing pawl joined with the handle, the indexing pawl extending toward and selectively engaging the ram at a first location; and
a blade joined with the handle distal from the pivot,
wherein the forward stroke of the handle pivots the handle about the pivot with the indexing pawl engaging the ram at the first location so that the ram pushes food material within the chamber through the cutting grid so as to produce extruded food material,
wherein the forward stroke of the handle moves the blade along a blade path adjacent the output side of cutting grid so as to slice the extruded food material to produce minced food parts;
whereby the culinary tool both extrudes material with the cutting grid and minces food material with the blade,
wherein a backlash pawl reset actuator joined with the housing, the backlash pawl reset actuator configured to selectively disengage the backlash pawl from the ram.

\* \* \* \* \*